May 21, 1963 P. J. LE BROOY 3,090,071
APPLICATOR FOR SPREADABLE FOOD PRODUCTS
Filed Aug. 19, 1960
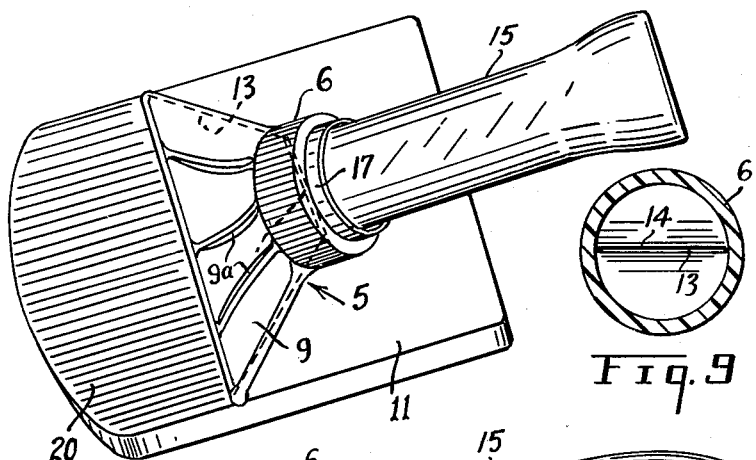
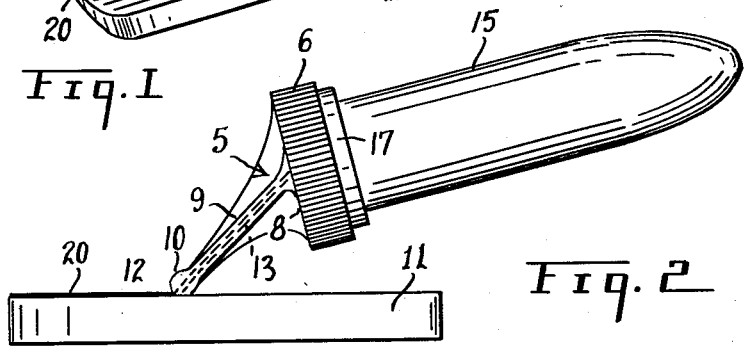
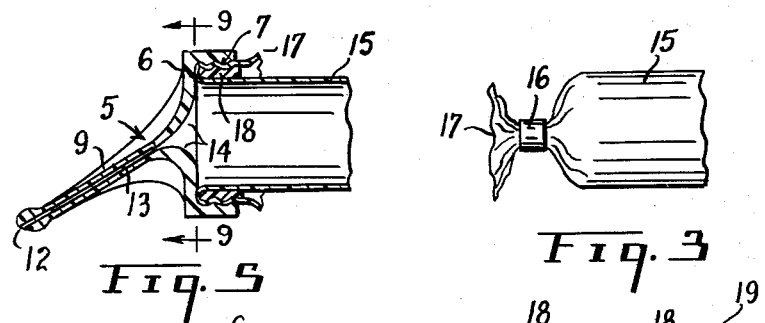
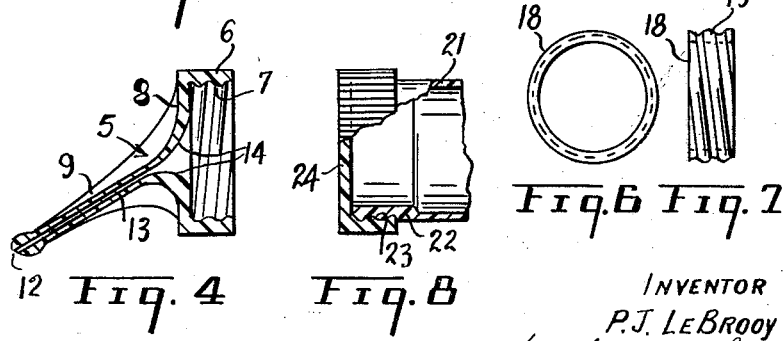
INVENTOR
P. J. LeBrooy
BY Hetherstonhaugh & Co.
ATTORNEYS United States Patent Office 3,090,071
Patented May 21, 1963

3,090,071
APPLICATOR FOR SPREADABLE FOOD PRODUCTS
Paul J. Le Brooy, 3131 Trafalgar Heights, Montreal, Quebec, Canada
Filed Aug. 19, 1960, Ser. No. 50,742
1 Claim. (Cl. 15—595)

This invention relates to applicators for spreading food products which are, or are capable of being made semi-liquid when their container is subjected to hot water. The food products intended to be spread by the applicator being mayonnaise, butter, cheese, jams and jellies and such like products which are normally spread on slices of bread.

The invention consists essentially in first having the food products intended for spreading to be made up in squeeze containers and having a spreader nozzle adapted to be secured to the outlet end of the squeeze container. The spreader nozzle is generally of flat triangular shape having its apex joined diagonally across the outer face of a circular cup shaped member adapted to make sealing contact with the outlet end of the squeeze container. The straight edge of the spreader nozzle opposite the cup shaped member is bulbous in transverse section to form a round spreader surface at the discharge outlet of the nozzle. The passage through the spreader nozzle from the cup shaped member to the bulbous discharge edge is also of triangular shape of thin suction and is capable of being cleaned by inserting the blade of a table knife into the passage at the cup shaped end of the nozzle and sweeping the knife blade back and forth in the nozzle passage.

The spreader nozzle is attached to the outlet end of the squeeze container in such a manner as to prevent leakage of the contents of the container at the joint and, when the container is squeezed, the contents will spread on the slice of bread in an even layer as the spreader is moved at an even rate over the surface of the bread at the same time as the squeeze container is squeezed by hand.

The object of the invention is to provide an applicator for spreadable food products which will spread the product in an even and homogeneous layer.

A further object of the invention is to provide an applicator for food products which can be readily attached to squeezable containers.

A further object of the invention is to provide an applicator for food products having a nozzle which will eject a wide and flat layer of the food product.

A further object of the invention is to provide a sanitary applicator for food products in which the contents of a food package can be spread without human handling.

These and other objects of the invention will be apparent from the following detailed description and the accompanying drawings in which:

FIG. 1 is a perspective view of the applicator applying a layer of spreadable food product to the surface of a slice of bread.

FIG. 2 is a vertical side elevation of the applicator shown in spreading attitude to the surface of the slice of bread.

FIG. 3 is a partial view of a spreadable food product package before attachment to the applicator nozzle.

FIG. 4 is a vertical section of the applicator nozzle shown in FIGS. 1 and 2.

FIG. 5 is a partial vertical section showing the applicator nozzle attached to the opened end of the package shown in FIG. 3.

FIG. 6 is a plan view of the ring shown in FIG. 5.

FIG. 7 is a side elevation of the ring shown in FIG. 6.

FIG. 8 is a partial view of an alternative form of package to which the applicator nozzle can be secured.

FIG. 9 is a vertical section on the line 9—9 of FIG. 5 showing the inner end of the nozzle passage.

Referring to the drawings, the nozzle 5 of the food product applicator consists of a cap portion 6 in the form of a cup whose inner annular wall is threaded at 7 for a purpose hereinafter described. Extending from the outer face 8 of the cap portion 6 is the nozzle 9 which is of flat triangular form offset at a relatively sharp angle from the outer face 8. The nozzle may be suitably ribbed at 9a to give added strength where the nozzle is made of light weight material such as plastic. The transverse edge 10 of the nozzle 9 is bulbous in section to provide a rounded spreading surface and which, when resting on the surface on which a product is to be spread, such as the slice of bread 11 shown in FIGS. 1 and 2, holds the outlet 12 of the nozzle passage 13, slightly elevated above the surface of the slice of bread 11. The inner end of the nozzle passage 13 is located diagonally across the inner surface of the wall 8 of the cap portion 6 as shown in FIG. 9 and has its edges 14 rounded to allow a smooth flow of the food products to the nozzle.

The outer peripheral surface of the cap portion 6 may be serrated or knurled for ease in attaching the nozzle to a package.

The present day tendency is to package foods in sanitary containers and it is the intention in the present invention to combine the above described nozzle with such a food package. In FIG. 3 of the drawings there is shown a food package from a polyethylene bag 15 whose open end 17 is secured by the band 16.

In FIG. 5 the nozzle 5 is shown attached to the open end 17 of the package 15. In this assembly an annular ring 18 has its outer peripheral surface threaded at 19, and is a slack fit with the threads 7 of the cap of the nozzle 5. After the band 16 has been removed from the package 15 the ring 18 is slipped over the open end of the package and the end 17 of the package is folded over the threaded portion of the ring 18. The nozzle 5 is then threaded on to the package covered ring in the manner shown in FIG. 5 with the folded over end 17 of the package making a tight seal between the cap portion 6 of the nozzle and the ring 18. The applicator is now complete with nozzle and food package as shown in FIGS. 1 and 2 and the contents of the package can be squeezed and forced through the passage 13 of the nozzle to form a spread 20 on the surface of the slice of bread 11.

The nozzle 5 can be secured to a more rigid type of squeezable container of the type shown in FIG. 8. In this alternative form the container 21 the neck 22 is thickened and is provided with an external thread 23. This form of package can be sealed by means of the threaded cap 24 which, when the package is to be used, is removed and replaced by the nozzle 5.

In operation of this invention, the packages 15 or 21 are made up with their contents of any type of food product which is normally spread on the surface of another form of food product. The spread food product may be mayonnaise, butter, cheese, jam or jelly and such like products. After the nozzle 5 has been attached to the package, if the package has been kept refrigerated, it can be dipped in hot water until the contents are in a semi-liquid form suitable to be forced through the passage of the nozzle when the package is squeezed. The assembled applicator consisting of package and nozzle is then held generally in the attitude shown in FIG. 2 with the bulbous edge 10 of the nozzle in contact with the surface to be spread. As the applicator is drawn along the surface to be spread, and the package is squeezed with a steady pressure, a thin layer 20 of the contents of the package is deposited and spread on the surface in the manner shown in FIGS. 1 and 2. By keeping the applicator in the same attitude with respect to the surface to be spread and the bulbous edge of the nozzle in contact with the surface, the contents of the package will be spread with an even thickness over the whole surface, with resulting economy in the use of the contents of the package and a more pleasing appearance to the spread.

If the contents of the package are only partly used, the assembled applicator can be kept in the refrigerator for later use or, the nozzle can be removed and the package resealed. The nozzle can be readily and easily cleaned by passing a table knife through the passage while submerged in washing water.

What I claim is:

An applicator for spreading food products on bread and the like, the said applicator comprising a flared nozzle member and a prepared food package of thin pliable material forming the handle for said applicator, the said nozzle member having an internally threaded sleeve and a thin flat triangular shaped nozzle flared outwardly from the said internally threaded sleeve, the said flat triangular shaped nozzle having a thin flat passage therethrough and open at one end to the interior of said threaded sleeve and at the opposite end terminating in an elongated and thin dispensing slot extending the full width of the flared nozzle, and means to join the open end of said package to the internally threaded end of said nozzle, the said means comprising a ring member threaded on its external peripheral surface, the open end of the said package adapted to be threaded through said ring and be folded back upon itself over the externally threaded surface of the ring, the folded back portion of the said package forming a seal between said ring and said nozzle when the said nozzle is threaded on to the ring.

References Cited in the file of this patent

UNITED STATES PATENTS

| | | |
|---|---|---|
| 1,453,415 | Stafford | May 1, 1923 |
| 2,321,333 | Terry | June 8, 1943 |
| 2,385,506 | Gurwick | Sept. 25, 1945 |
| 2,441,649 | Sprague | May 18, 1948 |
| 2,804,995 | Fee | Sept. 3, 1957 |
| 2,888,695 | Anderson et al. | June 2, 1959 |

FOREIGN PATENTS

| | | |
|---|---|---|
| 82,358 | Norway | Sept. 7, 1953 |
| 100,026 | Great Britain | Nov. 16, 1916 |